(12) United States Patent
Rana et al.

(10) Patent No.: US 12,430,164 B2
(45) Date of Patent: Sep. 30, 2025

(54) WORKFLOW GENERATION

(71) Applicant: HEXAGON TECHNOLOGY CENTER GMBH, Heerbrugg (CH)

(72) Inventors: Asif Rana, Widnau (CH); Roman Lampert, Göfis (AT); Bernd Reimann, Heerbrugg (CH); George Kenneth Thomas, Madison, AL (US); Johannes Maunz, Widnau (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 1136 days.

(21) Appl. No.: 16/967,405

(22) PCT Filed: Feb. 5, 2019

(86) PCT No.: PCT/EP2019/052792
§ 371 (c)(1),
(2) Date: Aug. 4, 2020

(87) PCT Pub. No.: WO2019/149961
PCT Pub. Date: Aug. 8, 2019

(65) Prior Publication Data
US 2021/0216359 A1 Jul. 15, 2021

(30) Foreign Application Priority Data
Feb. 5, 2018 (EP) .................... 18155182

(51) Int. Cl.
*G06F 9/48* (2006.01)
*G01C 15/00* (2006.01)
(Continued)

(52) U.S. Cl.
CPC ............ *G06F 9/4843* (2013.01); *G06F 40/40* (2020.01); *G06N 5/04* (2013.01); *G06N 20/00* (2019.01);
(Continued)

(58) Field of Classification Search
None
See application file for complete search history.

(56) References Cited

U.S. PATENT DOCUMENTS

| 7,735,060 B2 | 6/2010 | Harvey et al. |
| 11,755,005 B2 | 9/2023 | Winistörfer et al. |

(Continued)

FOREIGN PATENT DOCUMENTS

| EP | 3156898 A1 | 4/2017 |
| EP | 3 392 811 A1 | 10/2018 |

OTHER PUBLICATIONS

EdgeFrontier Fact Sheet, Intergraph Corporation (2013).
(Continued)

*Primary Examiner* — Bradley A Teets
*Assistant Examiner* — Melissa A Headly
(74) *Attorney, Agent, or Firm* — Maschoff Brennan

(57) ABSTRACT

A workflow generation system comprising a first device with a computing unit, a memory unit and a first communication unit, and a plurality of software agents used with a plurality of electronic apparatuses comprising at least one measuring device, wherein each software agent is installable on an electronic apparatus of the plurality of electronic apparatuses and exchanges data with the electronic apparatus, wherein the first device receives a measuring task and performs a workflow generation process to generate a workflow for performing the task involving one or more of the apparatuses, to generate workflow data allowing a respective apparatus to perform a part of the task, and to provide the workflow data to the software agents of the involved apparatuses, and provide configuration data to the software agents to reconfigure the respective apparatus for providing functions for performing the part of the task by the respective apparatus.

30 Claims, 4 Drawing Sheets

(51) Int. Cl.
  *G06F 40/40* (2020.01)
  *G06N 5/04* (2023.01)
  *G06N 20/00* (2019.01)
  *G06Q 10/10* (2023.01)
  *H04W 4/20* (2018.01)

(52) U.S. Cl.
  CPC .............. *G06Q 10/10* (2013.01); *H04W 4/20* (2013.01); *G01C 15/00* (2013.01)

(56) References Cited

U.S. PATENT DOCUMENTS

| | | | |
|---|---|---|---|
| 2008/0005287 A1 | 1/2008 | Harvey et al. | |
| 2008/0010631 A1 | 1/2008 | Harvey et al. | |
| 2008/0288621 A1* | 11/2008 | Snell | G06Q 10/06 715/765 |
| 2012/0013915 A1* | 1/2012 | Okamura | A61B 3/1025 356/213 |
| 2014/0095420 A1* | 4/2014 | Chun | G16H 40/67 706/46 |
| 2015/0339594 A1* | 11/2015 | Gallo | H04L 41/22 705/5 |
| 2016/0132214 A1* | 5/2016 | Koushik | G06F 8/61 715/741 |
| 2016/0245919 A1* | 8/2016 | Kalscheur | G01S 7/4817 |
| 2017/0351226 A1* | 12/2017 | Bliss | G05B 19/4063 |
| 2018/0232954 A1* | 8/2018 | Frank | A01C 3/02 |

OTHER PUBLICATIONS

EdgeFrontier Product Sheet, Intergraph Corporation (2016).
Leica Nova Ms60 Data Sheet, Leica Geosystems AG (2015).
Tataroiu, R., and Tudose, D., "Remote Monitoring and Control of Wireless Sensor," Retrieved from the Internet: URL: https://elf.cs.pub.ro/wsn/wiki/_media/pdf/cscs17.pdf Figures 3, 4, pp. 6 (May 31, 2009).
"Industrial robot—Wikipedia," Retrieved from the Internet: URL:https://en.wikipedia.org/w/index.php?title=Industrial robot&oldid=821804479, p. 1, Paragraph 1, Jan. 22, 2018.
"Kubernetes—Wikipedia," Retrieved from the Internet: URL:https://en.wikipedia.org/w/index.php? title=Kubernetes&oldid=822862688, p. 4, Figure 1, Jan. 28, 2018.
"Surveying—Wikipedia," Retrieved from the Internet: URL:https://en.wikipedia.org/w/index.php?title=Surveying&oldid=819872967, p. 1, Paragraph 1, Jan. 11, 2018.
Extended European Search Report Dated Jul. 2, 2018 as received in Application No. 18155182.1.

\* cited by examiner

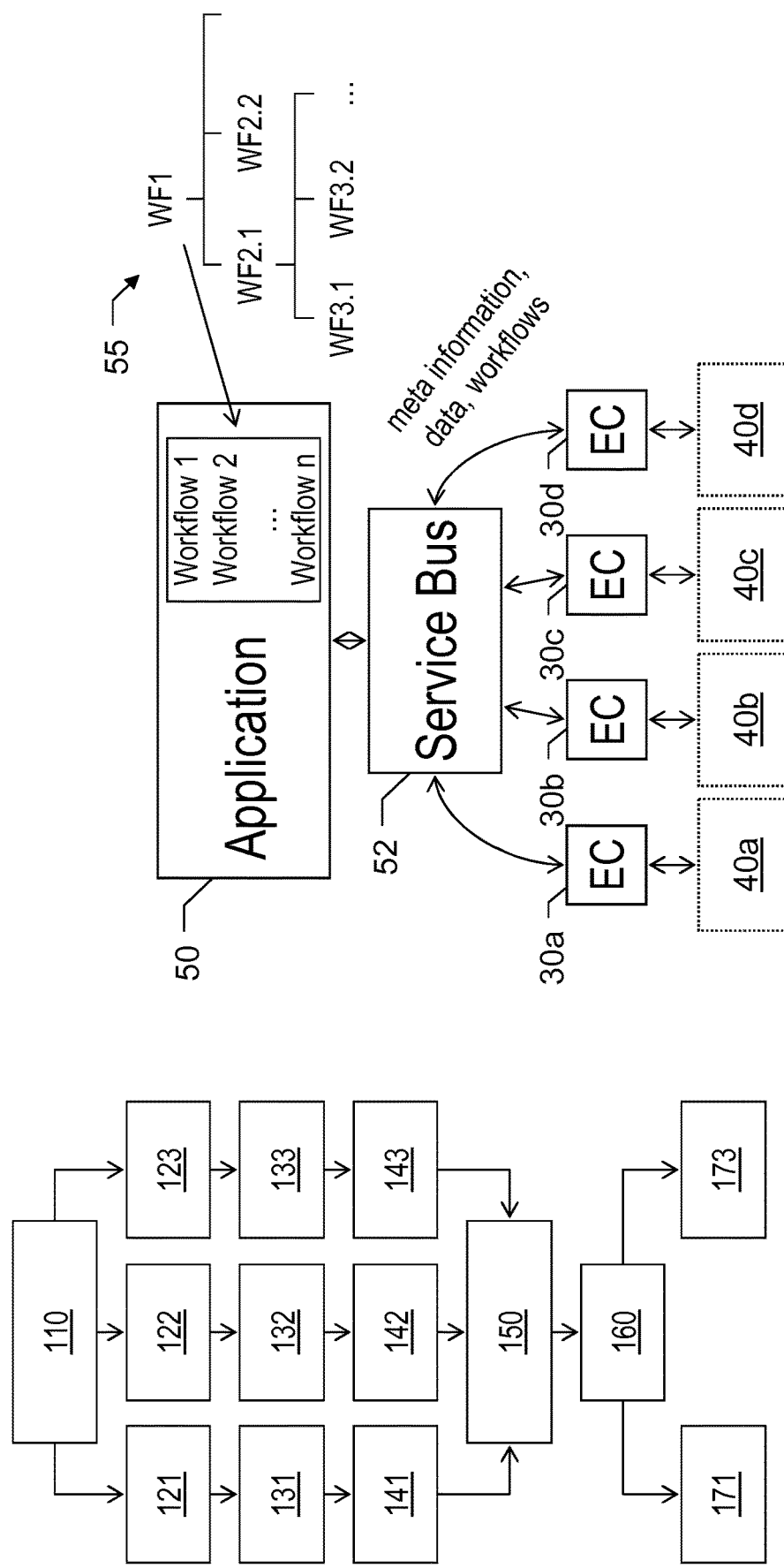

WORKFLOW GENERATION

The present invention pertains to a workflow generation system and method for generating a task-specific workflow to perform a measuring task jointly on a plurality of existing devices.

SUMMARY

A system according to some aspects of the invention, in the following also referred to as "EdgeClient" (EC), provides extensible IoT edge solution, process automation, secure edge connectivity and dynamically changeable workflows. It can be used together with a system and data integration software such as "EdgeFrontier" (EF) of Intergraph. Some integration tools that can be used with EC are disclosed in documents EP 3 156 898 A1, US 2008/0005287 A1, US 2008/0010631 A1 or U.S. Pat. No. 7,735,060 B2.

It is an object of some aspects of the present invention to provide a method and system to automatically generate optimized workflows for jointly accomplishing a task by a plurality of devices and/or persons.

Particularly, it is an object of some aspects to provide such a method and system that can be used with existing devices, legacy systems, and untrained users.

It is a further object of some aspects to provide such a method and system wherein the task is a measuring task and the devices are measuring devices, particularly surveying and reality capture devices.

At least one of these objects is achieved by the system and the method according to the independent claims and/or the dependent claims of the present invention. A first aspect of some embodiments of the invention relates to a workflow generation system comprising a first device having a computing unit, a memory unit and a first communication unit, and a plurality of software agents that are adapted to be used with a plurality of electronic apparatuses comprising one or more measuring devices. Each software agent is either installable on one of the plurality of electronic apparatuses or installed on a communication module of the system that is adapted to be connected to one of the electronic apparatuses and to exchange data with the apparatus connected to, wherein each software agent is adapted to exchange data with the electronic apparatus it is installed on or connected to.

According to this aspect of some embodiments of the invention, said first device is adapted to receive a measuring task and to perform, upon reception of the measuring task, a workflow generation process, in the course of which workflow generation process the first device is adapted to generate a workflow for performing the measuring task, the workflow involving one or more of the apparatuses. Moreover, the first device is adapted to generate workflow data for each of the involved apparatuses, which allows the respective apparatus to perform a part of the measuring task, and to provide the workflow data to the software agents of the involved apparatuses. The first device is further adapted to provide configuration data to the software agents of the involved apparatuses, the configuration data being adapted to reconfigure the respective apparatus for providing functions that allow or improve performing the part of the measuring task by the respective apparatus.

According to one embodiment, the system comprises at least one communication module that is adapted to be connected to one of the electronic apparatuses and to exchange data with the apparatus connected to, wherein at least one of the software agents is installed on one of the communication modules, and each of the communication modules comprises a communication unit adapted to communicate and exchange data with the first communication unit other communication units of other communication modules of the system.

According to another embodiment, the system comprises one or more of the plurality of electronic apparatuses.

According to another embodiment of the system, the electronic apparatuses of the system comprise at least one device that is adapted to allow installing external software and/or deploying a set of microservices, and a software agent is installed on the at least one device as a software application, particularly provided by means of a mobile app that can be used only for a certain workflow.

According to another embodiment of the system, the plurality of apparatuses comprise a plurality of measuring devices.

According to another embodiment of the system, the plurality of apparatuses comprise geodetic surveying devices and/or industrial measuring devices.

According to another embodiment of the system, the plurality of apparatuses comprise at least one laser scanner, laser tracker or reality capture device, in particular at least two laser scanners, at least two laser trackers or at least two reality capture devices.

According to another embodiment of the system, the configuration data provided to at least one measuring device is adapted to reconfigure the measuring device to adapt measurement parameters according to requirements of the measuring task or of the workflow or both.

According to another embodiment of the system, the measurement parameters comprise at least one of a measuring precision and a measuring programme speed of the measuring device.

According to another embodiment of the system, reconfiguring the measuring device comprises optimizing the measurement parameters with regard to a measuring precision or a duration of a measurement.

According to another embodiment of the system, the plurality of apparatuses comprise at least one laser scanner, a part of the workflow comprises using the laser scanner for performing a scan with a needed resolution, and the configuration data provided to the laser scanner is adapted to reconfigure the laser scanner to perform the scan with no more than the needed resolution for performing the scan faster.

According to another embodiment of the system, the plurality of apparatuses comprise at least one laser scanner, a part of the workflow comprises using the laser scanner for performing a scan within a given time, and the configuration data provided to the laser scanner is adapted to reconfigure the laser scanner to perform the scan with the maximum possible resolution for performing the scan in the given time.

According to another embodiment of the system, the plurality of apparatuses comprise one or more actuating devices, such as industrial machines, manufacturing robots or construction machinery.

According to another embodiment of the system, the workflow involves at least two cooperating apparatuses that work together to perform the task or a part of the task, wherein the at least two cooperating apparatuses have incompatible software standards, e. g. wherein the cooperating apparatuses are made by different manufacturers, and the configuration data provided to said cooperating apparatuses is adapted to reconfigure the cooperating apparatuses for providing functions that allow working together.

According to another embodiment of the system, one or more of the plurality of apparatuses are remote apparatuses, for instance being positioned more than 100 metres away from the first device.

According to another embodiment of the system, the workflow data and configuration data is provided to software agents of the one or more remote apparatuses via the Internet.

According to another embodiment of the system, the first device comprises an encoding algorithm that is adapted to encode the configuration data, and the software agents comprise a decoding algorithm that is adapted to decode the configuration data encoded by the encoding algorithm, wherein the encoded configuration data is provided to the software agents.

According to another embodiment of the system, in the course of the workflow generation process, the first device is adapted to request and receive from the plurality of agents information about a location of the respective apparatus, wherein the configuration data is adapted to reconfigure the respective apparatus to adapt to conditions of the location.

According to another embodiment of the system, the configuration data is adapted to reconfigure the respective apparatus to adapt to safety regulations effective at said location.

According to another embodiment of the system, the configuration data is adapted to reconfigure the respective apparatus to a set of rules effective at the location by deactivating functions of the respective apparatus, particularly wherein the set of rules comprises legal regulations or patent rights effective at said location.

According to another embodiment of the system, the configuration data is adapted to reconfigure the respective apparatus to select an appropriate language for output of user instructions.

According to another embodiment of the system, the configuration data is adapted to reconfigure the respective apparatus to work with a coherent system of units used throughout the workflow.

According to another embodiment of the system, the plurality of apparatuses comprises at least one distance measuring device, and the configuration data is adapted to reconfigure a light intensity of a laser of the distance measuring device.

According to another embodiment of the system, the configuration data is adapted to reconfigure the respective apparatus to block at least one functionality of the apparatus.

According to another embodiment of the system, the configuration data is adapted to reconfigure the respective apparatus to block one or more functionalities of the apparatus that are not required for performing the task or the part of the task.

According to another embodiment of the system, in the course of the workflow generation process, the first device is adapted to request and receive from the plurality of agents task-specific data of the apparatuses, wherein the task-specific data comprises information about properties, a position and/or a workload that are associated with the respective apparatus, wherein the configuration data is provided based on the task-specific data.

According to another embodiment of the system, the first device is adapted to perform the workflow generation process fully autonomously.

According to another embodiment of the system, the first device is adapted to provide a signal to the software agents of the involved apparatuses to trigger executing the workflow by the respective apparatuses.

A second aspect of some embodiments of the invention pertains to a computer-implemented method for generating a task-specific workflow to perform a measuring task jointly by means by a plurality of electronic apparatuses comprising one or more measuring devices. The method comprises
  providing a workflow generation system, such as the system according to the first aspect of the invention, wherein the workflow generation system comprises a first device having a computing unit, a memory unit and a first communication unit,
  providing a software agent to each one of the apparatuses, wherein each software agent is adapted to exchange data with the electronic apparatus and wherein providing the software agent comprises either installing a software agent on the apparatus or connecting a communication module to the apparatus, wherein a software agent is installed on the communication module,
  receiving, by the first device, information about the measuring task to be performed, and performing, particularly fully autonomously, a workflow generation process comprising
    generating, by means of an algorithm and based on the measuring task, a workflow for performing the measuring task, the workflow involving one or more of the apparatuses,
    generating workflow data for each of the involved apparatuses, the workflow data allowing the respective apparatus to perform a part of the task,
    generating configuration data for at least one of the involved apparatuses, the configuration data being adapted to reconfigure the respective apparatus for providing functions that allow or improve performing the part of the measuring task, and
    providing the respective workflow data and configuration data to the software agents of the involved apparatuses.

According to one embodiment, the method comprises installing at least one of the software agents on one of at least one communication module, wherein the communication module is connected to one of the electronic apparatuses and adapted to exchange data with the apparatus connected to, and comprises a communication unit adapted to communicate and exchange data with the first communication unit and other communication units of other communication modules of the system.

According to another embodiment, the method comprises installing a software agent on at least one of the electronic apparatuses as a software application, particularly provided by means of a mobile app that can be used only for a certain workflow.

According to another embodiment of the method, the at least one of the involved apparatuses is reconfigured by the configuration data to comprise the functions that allow or improve performing the part of the measuring task, and executes the part of the measuring task according to the workflow data using said functions.

According to another embodiment of the method, the measuring task is performed according to the workflow by the involved apparatuses.

According to another embodiment of the method, the plurality of apparatuses comprise a plurality of measuring devices.

According to another embodiment of the method, the plurality of apparatuses comprise one or more geodetic surveying devices and/or industrial measuring devices.

According to another embodiment of the method, the plurality of apparatuses comprise at least one laser scanner, laser tracker or reality capture device, in particular at least two laser scanners, at least two laser trackers or at least two reality capture devices.

According to another embodiment of the method, at least one measuring device is reconfigured by the configuration data to adapt a measuring precision and/or a measuring programme speed of the measuring device according to requirements of the measuring task, of the workflow or both.

According to another embodiment of the method, the measurement parameters comprise a measuring precision and/or a measuring programme speed of the measuring device.

According to another embodiment of the method, reconfiguring the measuring device comprises optimizing the measurement parameters with regard to a measuring precision or a duration of a measurement.

According to another embodiment of the method, the plurality of apparatuses comprise at least one laser scanner, a part of the workflow comprises using the laser scanner for performing a scan with a needed resolution, and the laser scanner is reconfigured by the provided configuration data to perform the scan with no more than the needed resolution for performing the scan faster.

According to another embodiment of the method, the plurality of apparatuses comprise at least one laser scanner, a part of the workflow comprises using the laser scanner for performing a scan within a given time, and the laser scanner is reconfigured by the provided configuration data to perform the scan with the maximum possible resolution for performing the scan in the given time.

According to another embodiment, the method comprises sending feedback from the involved apparatuses to the first device, the feedback comprising information about non-completion of a task and errors.

According to another embodiment of the method, repeating, based on the feedback information and using machine-learning, the task by the same apparatus in an improved manner.

According to another embodiment of the method, re-assigning, based on the feedback information and using machine-learning, the task to another apparatus of the plurality of apparatuses.

A third aspect of some embodiments the invention relates to a computer programme product comprising programme code which is stored on a machine-readable medium, or being embodied by an electromagnetic wave comprising a programme code segment, and having computer-executable instructions for performing, in particular when run on a computing unit of the first device of a system according to the first aspect of the invention, at least the following steps of the method according to the second aspect of the invention:

- generating, based on the measuring task, a workflow for performing the measuring task, the workflow involving one or more of the apparatuses,
- generating workflow data for each of the involved apparatuses,
- generating configuration data for at least one of the involved apparatuses, and
- transmitting the respective workflow data and configuration data to the involved apparatuses.

BRIEF DESCRIPTION OF THE DRAWINGS

The invention in the following will be described in detail by referring to exemplary embodiments that are accompanied by figures, in which:

FIG. 1 illustrates a first exemplary embodiment of a method according to the invention;

FIG. 2a shows a first exemplary application for generating workflows;

DETAILED DESCRIPTION

Figure 2B:
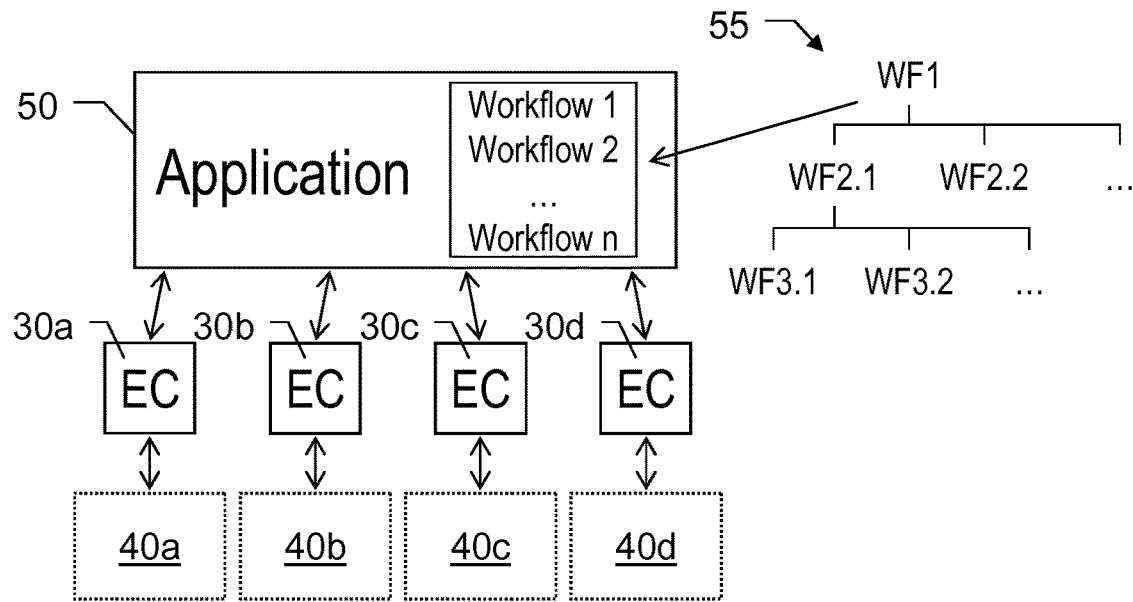
FIG. 2b shows a second exemplary application for generating workflows.

FIG. 1 shows a flowchart illustrating an exemplary embodiment of a method 100 for generating a workflow according to the invention. In a first step 110 a task is received, e. g. through a user input in a computing device. This device requests task specific data of a plurality of remote devices from a plurality of connected software agents that provide a functionality or feature set. In this example there are three devices A, B and C, so that the method 100 comprises three steps 121-123 that can be performed basically simultaneously: step 121 requesting task specific data of device A, step 122 requesting task specific data of device B and step 123 requesting task specific data of device C. Subsequently, in steps 131, 132 and 133 the requested task specific data of devices A, B and C is received by the device, and in steps 141, 142 and 143 task-specific abilities of devices A, B and C are assessed by the device. Having assessed all devices' abilities, a workflow can be generated by the device in step 150. Workflow data for each device involved is generated in step 160 and subsequently transmitted to the involved devices in steps 171 and 173. In the shown example, as a result of the ability assessments (steps 141-143), the generated workflow only involves two of the three devices, wherefore only these two need to receive the respective workflow data to perform their part of the task.

FIG. 2a shows a first exemplary embodiment of an application 50 with several software agents provided in agent modules 30a-d connected to devices 40a-d and connected together using a service bus 52. A system according to the invention can comprise several agent modules 30a-d connected together using a service bus or a system and data integration software such as EdgeFrontier® (EF) of Intergraph Corporation. Applicable integration tools to be used with the application are generally known in the art and disclosed e. g. in the documents EP 3 156 898 A1, US 2008/0005287 A1, US 2008/0010631 A1 and U.S. Pat. No. 7,735,060 B2.

The application 50 may run one or more workflows (WF) as described by a user using a descriptive language like XML or JSON and programming languages like Java Script and Python. These workflows are decomposed into simpler workflows 55 (WF1, WF2.1, WF2.2, WF3.1, WF3.2, . . . ) that can run on individual modules based on a dependency-tree analysis. This analysis works on the principle that if a workflow meets all of its dependencies in a given agent module 30a-d, then it should run locally there. However, if all the dependencies are not met in one module, then a part of the workflow will run at a higher level shown as the service bus 52.

The dependency-tree analysis does not need to be limited to only two levels (module and service bus). In fact, this principle targets the local-most possible execution of the logic in the workflows. If a workflow can run on the module, it will do so. If it needs information from several modules, then these modules can self-coordinate with each other to execute it. In this case the dependencies are expanded to include all of them and exclude all others. Finally, an enterprise service bus can be used if all of the underlying modules are needed as dependencies.

Alternatively, for instance if according to any pre-defined metric it would be more efficient, the logic can be run at the service bus level even though the dependencies are met at any level below it.

FIG. 2b shows a second embodiment without a server bus. The software agents provided in agent modules 30a-d are connected directly to the application 50. One of the modules 30a-d is responsible for creating workflows, decomposing and dispatching them.

Also a combination of the two embodiments is possible, so that data can flow through the service bus 52 or directly via the agents to the application 50.

If the modules self-coordinate with each other to execute a workflow in a distributed setup there can be an elected master of the workflow that will be responsible for the workflow. This master can be automatically replaced with another module, e. g. if the master goes down because of an anomalous condition.

Figure 3A:
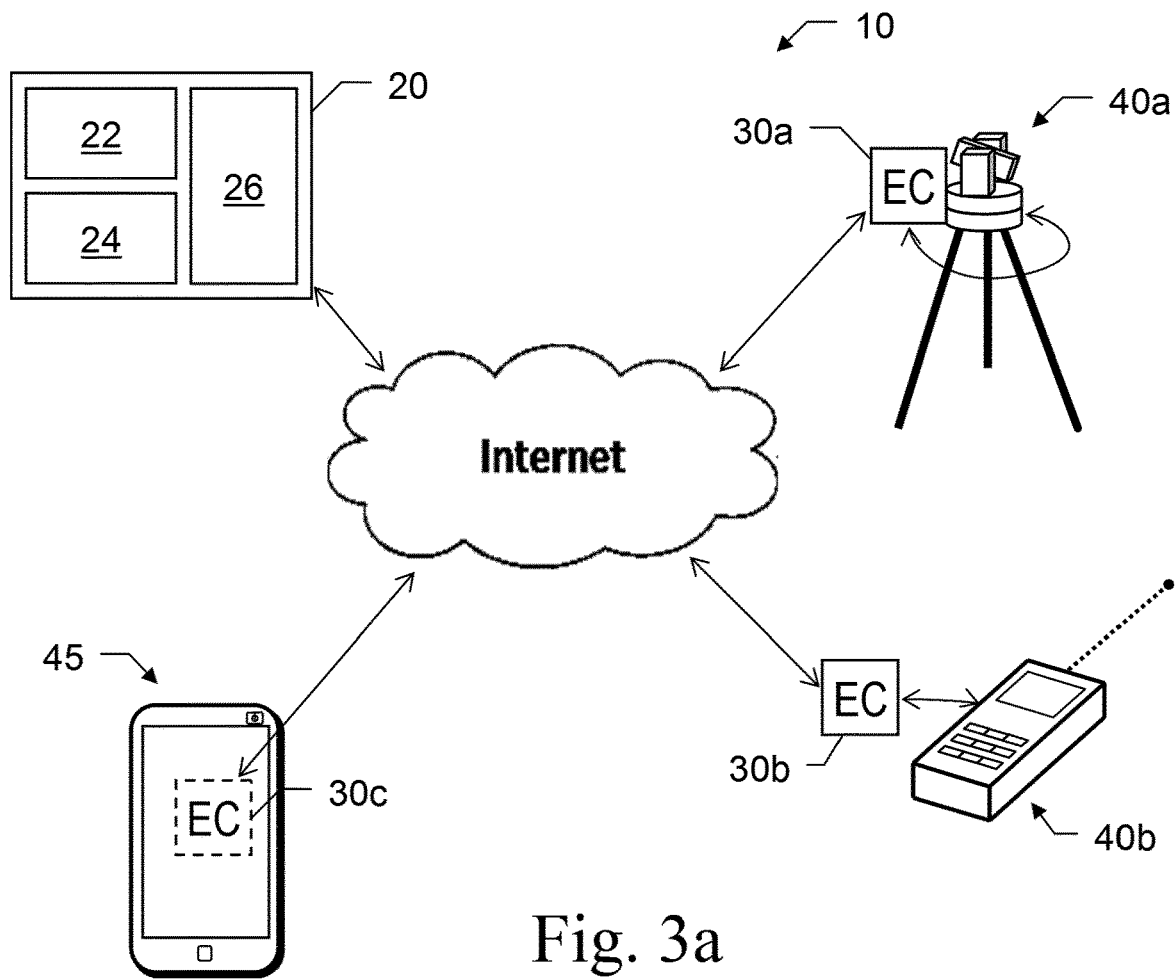
FIG. 3a shows a first exemplary embodiment of a system according to the invention.
Figure 3B:
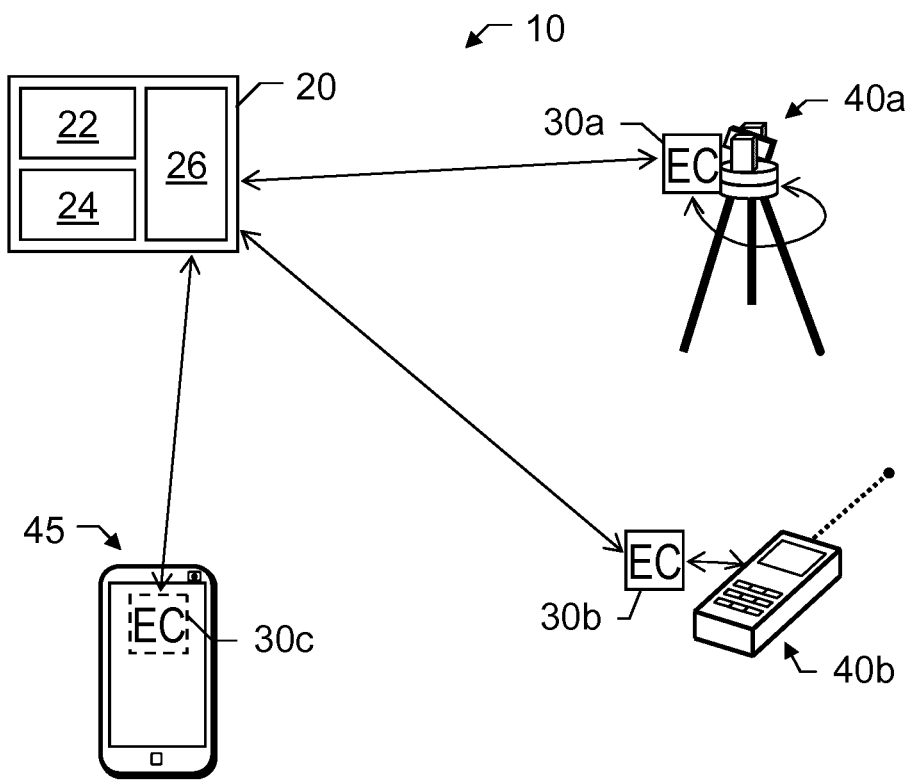
FIG. 3b shows a second exemplary embodiment of a system according to the invention.

FIGS. 3a and 3b illustrate two exemplary embodiments of a system 10 according to the invention. In both embodiments, the system 10 comprises a first user device 20 and three EC software agents 30a-c, wherein two agents are provided in agent modules 30a-b and one software agent 30c is installed directly on an external device 45.

Although the depicted devices in these examples comprise measuring tools, the agents can also be provided in or at actuating devices, like machine tools, industrial machines, manufacturing robots or construction machinery. Also other kinds of measuring devices than the depicted ones can be used, e. g. reality capture devices, laser trackers or total stations.

The modules 30a-b with the agents installed thereon are connected to external devices 40a-b and adapted to exchange data with the respective connected device. For instance, such a connection might include using a universal serial bus (USB) or other hardware interface or a wireless data connection such as Bluetooth.

In the shown example, the devices comprise two measuring devices, i.e. a laser scanning device 40a and a hand-held laser distance meter 40b, and a portable electronic device 45 that is assigned to a certain user. For instance, the portable device 45 can be a smartphone or tablet PC or a wearable such as a smart watch. As device 45 is adapted to allow installing external software or deploying a set of microservices, the respective agent 30c can be provided as a software application directly in the external device 45 instead of being provided in a module that is connectable to the device 45. It is also possible to provide the software by app delivery, e. g. by means of a mobile app that can be used for a certain workflow only or for a multitude of different workflows.

The first device 20 comprises a computing unit 22 comprising a processor, a memory unit 24 adapted for storing data, and a communication unit 26 (e. g. comprising a modem) allowing data interchange with the agents 30a-c.

Alternatively, the first device 20 can be embodied by a plurality of devices, with a user device operated by a user and further devices for performing the computing. Also, the application may run in a cloud. The first user device 20 may optionally also be embodied by a cloud or a plurality of devices.

In the first embodiment shown in FIG. 3a the first device 20 is connected via the Internet with the remote agent modules 30a-b and the portable device 45 comprising the third agent 30c. This is especially useful, if a direct data transfer is not possible because the devices are positioned at a larger distance from each other, e. g. more than a hundred meters away, or if a workflow comprises capturing data of a sky scraper with multiple measuring devices positioned in several stories of the building.

In the second embodiment of FIG. 3b the first device 20 and the agents 30a-c are grouped locally together and connected with each other, for instance wirelessly, e. g. by means of a wireless local area network (WLAN) or by means of mesh networks such as LoRa or ZigBee or Bluetooth.

Combinations of the embodiments of FIGS. 3a and 3b are possible as well. For instance, some devices or modules may be connected via Internet and others connected locally to the first device 20. Also, devices or modules can have both local and cloud connections.

The first device 20 can be a first user device such as a personal computer that is operated by a user and comprises input means such as keyboard and mouse for entering or selecting a task to be performed by the devices 40a-b, 45. Alternatively, especially in case of the second embodiment, the first user device 20 can be another portable device (such as the second user device 45).

As shown in FIGS. 3a and 3b, the task-specific workflows can be deployed on-demand and in a real-time manner to remote devices 40a-d as well as to other software applications or modules that run on the agent modules 30a-b or the second user device 45 and if needed may include human interaction. The workflow may also include coordinating interaction between two or more humans who are part of a specific workflow.

This allows sending customized on-demand step-by-step workflows to guide one or more users in carrying out a given operation or even allows unguided execution of these workflows. The workflows can comprise instructions for only human, or only machine, or both. It means that advantageously even a novice person can operate complex equipment and can carry out a complex job based on the on-demand workflow.

For example, a guided workflow on how to measure or layout a given object using any measurement devices (for example, as shown, a scanner 40a and a distance meter 40b) is sent on-demand via a cloud directly to the devices and machines. Advantageously, these workflows can be deployed to the agents in the measuring devices without rebuilding or changing the firmware. The cloud can be in the internet as well as a local cloud setup.

In addition, a high-level workflow can be sent to a hand-held device 45 of a user if a human input is needed. The input may simply comprise an authorization or a command to start the operation. In a similar manner, further devices or entities can join the solution to provide additional services in the setup. As an example, an EC-application running on a smart watch can monitor the process and subscribe to the warnings or errors, depending on the system configuration, to alert the user in a real-time manner. Similarly, the same EC-application can be reconfigured in real-time to additionally also track the user. This can be used as part of the solution to provide value-added services like fatigue-monitoring. The wearables (smart watches, AR/VR devices, activity trackers, etc.) can provide a natural extension for edge intelligence platforms to sense and provide data and services to the user. Summarizing, this solution provides all the flexibility to augment an existing solution with new capabilities, to change the behavior of an existing system, or to reconfigure the solution to provide new services.

Such a high-level workflow can also be sent to multiple human users. For example, a scan measurement where one user is required to move a scanner to the next scanning position while another user gets real-time notifications to remove obstructions while the scan is in progress and yet another human user as a first verifier in the loop before committing the scans to the repository. Advantageously, none of these persons need to be pre-trained for such a complex setup. It is even possible to change the workflow every day without any pre-training of the involved personnel being required.

Advantageously, the device workflow can be adapted to the knowledge of a user and tailored to specific applications, situations and users. Optionally, a level of education or know-how of the operator can be detected, and workflows can be modified according to local regulations. In addition, the workflows can also be generated dynamically to take into consideration the situation at hand, e. g. capabilities of available devices, device health status, and device failure prediction, etc. Feedback about the quality of the job can be computed in real-time based on the achieved results and on past key performance indicators (KPI).

For instance, a step-by-step workflow is sent to the hand-held device 45 of a forensic investigator to accurately and efficiently capture all the relevant details from a crime scene that may also involve different measurement devices 40a-b or other devices necessary to carry out this job. The workflow can be auto-generated based on various factors, e. g. on the nature and location of the crime scene, forensic devices present, technical know-how of the forensic investigator, other persons or agencies involved, etc.

The workflows mentioned above can be generated locally based on the local inputs to the system 10 (FIG. 3b); they can also be computed in a cloud, optionally being also based on inputs from other sources or on the analytics on the previous and current data.

A generated workflow can be deployed via the agent modules 30a-c from the cloud to a user device (e. g. a hand-held device 45) and thus to a human, to the measuring devices 40a-b, or to both.

The workflow may also be deployed only to a user device 45 which controls the other devices 40a-b. For example, the user starts his application in a construction site, the application takes inventory of all available devices and enumerates their capabilities and sends this information to the cloud. The user then enters his wish to carry out a certain action, e. g. check if a building has been built according to the specifications. This input is processed by the cloud/local analytics engine and based on the available devices & resources. A customized workflow is generated and downloaded to the user device 40c which then guides the users, as well as controls the machines, to complete the job at hand.

In addition to the dynamically deployable workflows, the system optionally also provides a functionality to orchestrate new functionalities for the devices 40a-c. These new functionalities may comprise e. g. algorithms, fog analytics, control system strategies or safety & security features.

This is possible e. g. through a combination of publishing of device information and reflection (="self-description") of the devices' capabilities. The integration of all this information allows the orchestration of algorithms, analytics, etc. with the deployment of new workflows to specific systems. The system can play the role of the orchestrator of many systems with its ability to deploy workflows to other systems. Depending on the situation, one of the agents can also take the role of an orchestrator to manage other agents.

Also virtual devices can be formed that have capabilities of different devices merged. Devices can learn to understand, group and tailor device functionalities. Other devices can be mimicked. For instance, a total station, such as e. g. the Leica Nova MS60, could mimic the functions of a laser scanner, a handheld distance meter or even a plumb.

Figure 4:
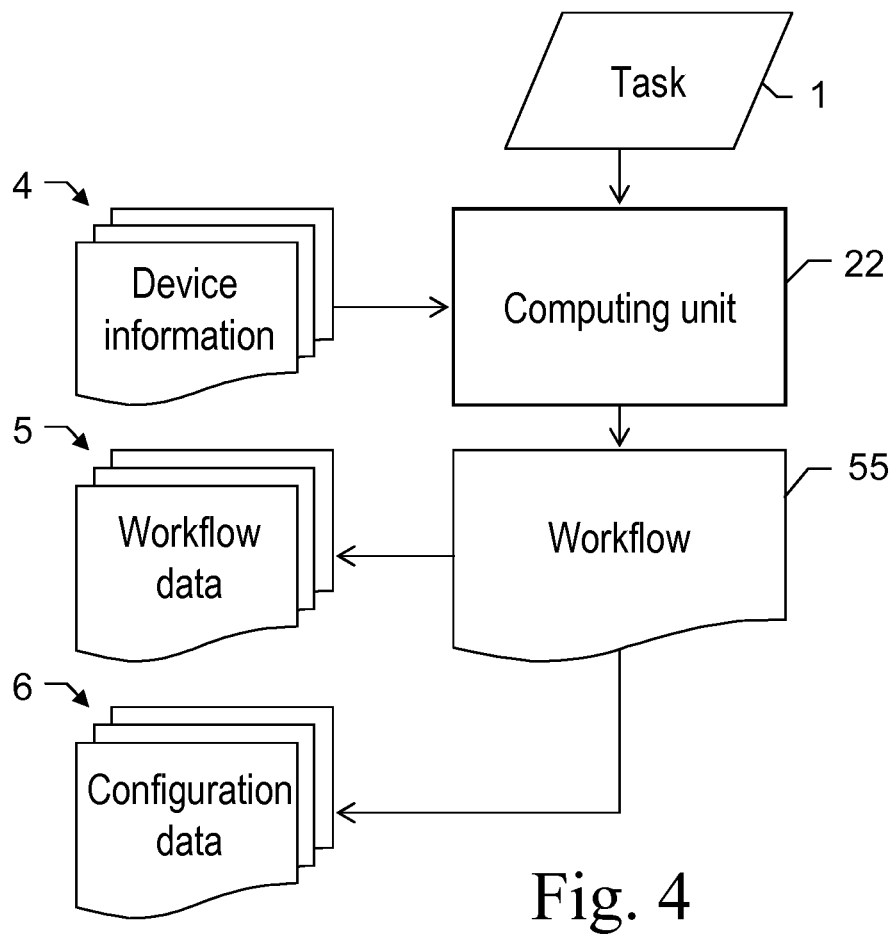
FIG. 4 illustrates the information stream in an exemplary embodiment of a system according to the invention.

FIG. 4 illustrates the information stream in an exemplary embodiment of a system according to the invention. The computing device 22 receives information about a task 1 to be performed. Consequently, based on task-related device information 4 of available devices, the computing device 22 assesses the available devices' abilities with respect to the task 1 at hand. Optionally, the task-related device information 4 may be requested and received from the available devices.

Based on the ability assessment, an optimized workflow 55 involving all or some of the devices is calculated by the computing device 22. Workflow data 5 for each of the involved devices is generated that allows the respective device to perform its part of the task 1 as defined in the workflow 55. The workflow data 5 is then transmitted to the involved devices.

Furthermore, based on the workflow 55 and on the device information 4, the computing unit 22 is adapted to generate configuration data 6 for one or more of the involved devices and provided it to the software agents of these devices. This configuration data 6 is adapted to reconfigure the device it is provided to in order to allow performing the part of the task according to the workflow.

The configuration data need not be generated for all involved devices. Instead, based on the device information 4, the computing unit 22 assesses which device can be reconfigured in which way in order to allow or improve performing a part of the task by the respective device thus improving the workflow.

Reconfiguration optionally may comprise also configuring a device to comply with company standards and regulations, user limitations or local regulations.

If the device is a surveying device, the configuration data 6 for example can reconfigure the surveying device to adapt a measuring precision of the device or a measuring programme speed according to the needs given by the task or by the workflow. For instance, in case of a laser scanner, if a scan with only a low resolution is needed to proceed with the next steps of the workflow, the scanner can be reconfigured to perform the scan faster, thus accelerating the whole workflow.

If the scanner does not possess the capability required for this workflow, then the computing unit 22 can contact the vendor or manufactures and by payment of a given fee, the feature can be activated in the scanner to continue with the workflow. This functionality is described in detail in the European Patent Application No. 17167585.3. Since the system has an overview of the capabilities and measurement speed, given the past metrics, it can potentially also calculate the monetary return (ROI) if a certain new feature needs to be enabled.

If the workflow involves the cooperation of two or more devices to work together to perform the task or a part of the task, and if these two or more devices are generally not adapted to work together, e. g. due to different manufacturers of the devices resulting in incompatible software standards, the configuration data 6 might reconfigure the devices in such a way that allow them to work together to perform the task.

If the device information 4 comprises information about a location of the devices, the configuration data optionally can reconfigure the devices to adapt to certain conditions of the location, such as legal regulations effective at that location. These legal regulations may include safety regulations. For instance, the light intensity of the laser of a distance measuring device can be adapted. The regulations may also include patent rights and the configuration data can deactivate certain protected functions of the devices.

The local conditions can also comprise the use of different systems of units used at different locations. The configuration data then, for instance, can be used to reconfigure all devices involved in the workflow to use the same system of units. Likewise, a standard language in which information is provided to a user of a device can be chosen based on the location, e. g. such that devices depending on language preferences of the user provide information in the most appropriate language.

Especially if the devices are remote devices, the workflow data 5 and configuration data 6 can be sent encrypted.

If the device is a machine, the task-related device information 4 comprises information about properties, a position and/or a workload of the machine, and the workflow data 5 comprises machine-readable instructions.

If the device is a user device, the task-related device information 4 comprises information about the user of the device, e. g. task-related knowledge, and the workflow data 5 comprises instructions for a human.

Figure 5:
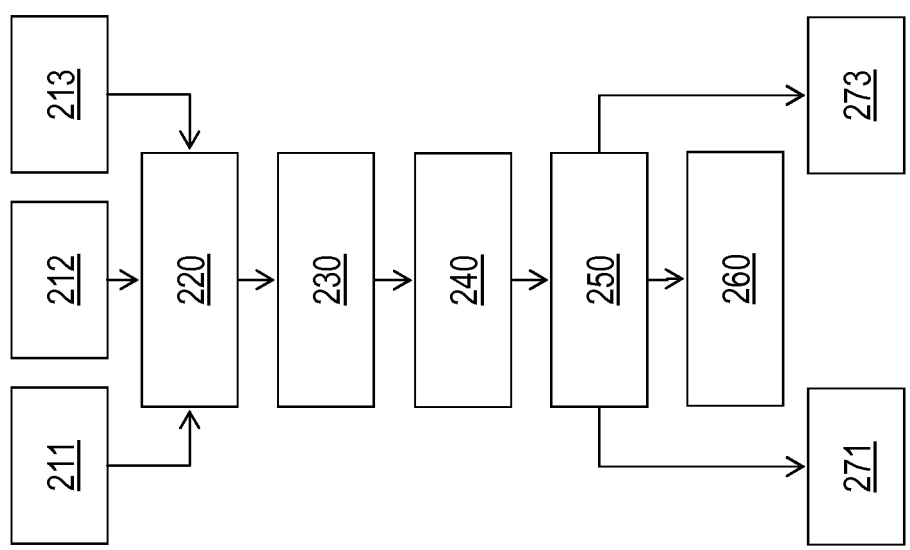
FIG. 5 illustrates a second exemplary embodiment of a method according to the invention.

FIG. 5 shows a flowchart illustrating another exemplary embodiment of a method 200 for generating a workflow.

In this embodiment, the devices are rendered self-describing by connecting agent modules or installing the agents. The method 200 starts with publishing the capabilities of three devices via the EC-modules in steps 211, 212 and 213. Then, in step 220 the capabilities are received and read by a user device, e. g. the first device of FIGS. 3a-b. Based on the devices' capabilities, actions are defined and published by the user device (step 230).

In step 240, customized workflows are defined for each device. This step may either be executed on the user device itself or using computing capacities of a cloud. In step 250, the workflow is sent to the respective devices—if the workflows are defined in the cloud, a workflow is also sent to the user device.

Step 260 comprises executing the workflow on the user device to guide the user through the workflow and optionally to trigger the workflows in the other devices. In steps 271 and 273 the workflows sent to the devices are executed to perform a part of the task. Execution of the workflow may be started when triggered by the user device or autonomously. Particularly, autonomous execution may include using machine learning.

Additionally, the method may comprise sending feedback from the two devices to the user device, informing about successful completion of the task or of non-completion and respective errors. Based on this information, and using e. g. machine learning, appropriate actions can be carried out such as repetition of the task by the same device in the same or an improved manner, re-assignment of the task to another device, etc.

If a certain device involved in a workflow cannot perform its task in a timely manner, a feedback can be sent and the first device 20 can delegate the workflow generation process to any other device taking into account other ongoing workflows and tasks.

The automatically generated workflow can be improved based on the computation of pre-defined or dynamically computed key performance indicators (KPI). The improved workflow can then be redistributed to all the components of the system running the software agents. This provides a continuously improving and learning intelligence for the task at hand.

The remote deployment of the workflows can also be used to add, remove or alter the capabilities of an existing device or software program. For examples, this may comprise:

enabling and disabling of geo-fencing on a software or device (machine, app, user) based on the results of a new policy or of analytics from cloud;

increasing or decreasing the measurement accuracy and/or the speed of a coordinate measurement machine or a sensor;

automatic increase or decrease of the engine torque of a tractor based on the needs of a self-managing smart agriculture farm; or re-planning of individual inspection missions of a swarm of unmanned aerial or ground vehicles (UAV/UGV) based on their exploratory findings or modified mission boundary conditions and/or targets; or enabling and disabling of scanning capabilities (e. g. scanning of jet turbine blisks) on coordinate measurement machines or the user software for such machines.

Each level of execution and generation of workflows may add additional context to the decision making and processing. The more devices, sensors or data sources are connected to the service bus or intelligent information platform, the more contextual information can be used to generate the workflows. For instance, knowledge about the states of different trades working on a construction site allows generating optimized workflows for all trades.

Figure 6:
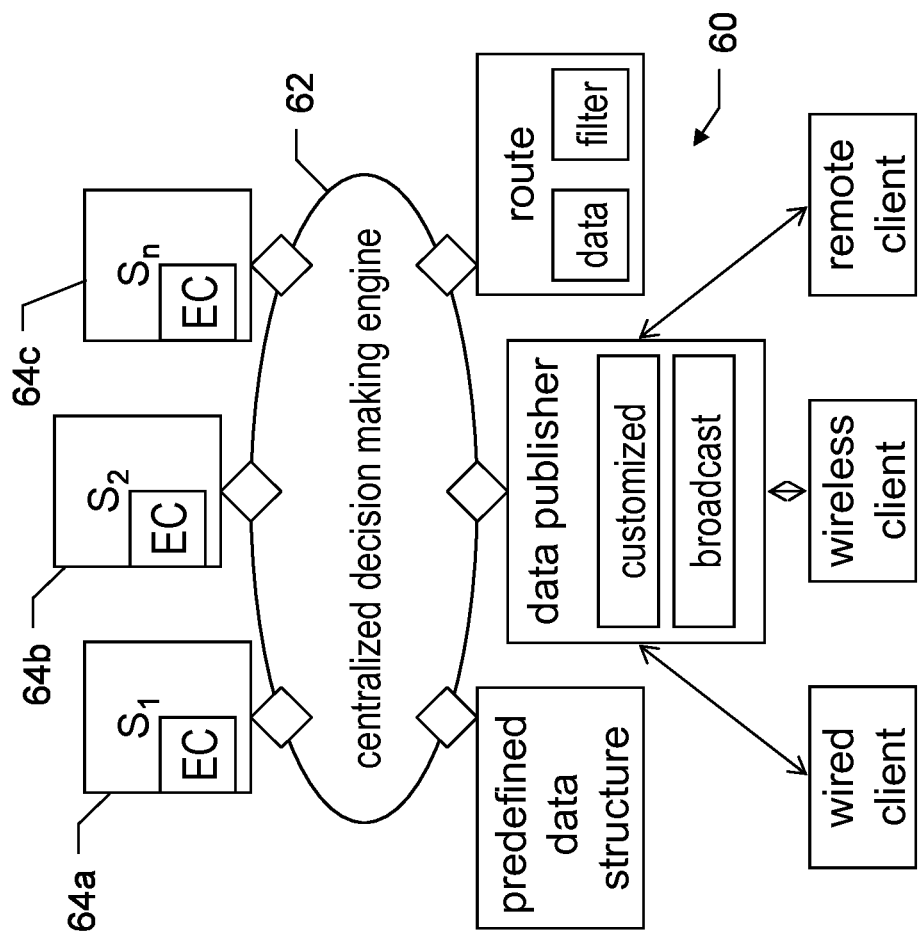
FIG. 6 illustrates an intelligent information platform used together with a system according to the invention.

FIG. 6 illustrates an intelligent information platform used together with a system according to the invention. In general, such a platform is described e. g. in the document EP 3 156 898 A1. The intelligent information platform provides a fully configurable distributed ERP-like (ERP=enterprise resource plan) information processing platform 60 that routes the information, based on certain rules and policies to a centralized decision-making engine 62.

With the present invention, in addition to the system described in EP 3 156 898 A1, by embedding EC agents, the customized adapters 64a-c, as annotated by $S_1 \ldots S_n$, can be made intelligent through edge analytics and dynamically deployable workflows while still residing inside those external systems.

Although the invention is illustrated above, partly with reference to some preferred embodiments, it must be understood that numerous modifications and combinations of different features of the embodiments can be made. All of these modifications lie within the scope of the appended claims.

What is claimed is:

1. A workflow generation system, the workflow involving a cooperation of two or more devices to work together to perform a measuring task or a part of the measuring task, the workflow generation system comprising:
- a first device having a computing unit, a memory unit, and a first communication unit; and
- a plurality of software agents provided in agent modules, which agents are configured to be used with a plurality of electronic apparatuses comprising a plurality of geodetic surveying devices or industrial measuring devices, wherein each software agent of the plurality of software agents is installable on an electronic apparatus of the plurality of electronic apparatuses or installed on a communication module that is configured to be connected to one of the electronic apparatuses and to exchange data therewith,
- a service bus connecting the first device with the plurality of electronic apparatuses,
- wherein the first device is configured to receive a measuring task and perform, upon reception of the measuring task, a workflow generation process, in the course of which workflow generation process the first device is configured to:
- perform an ability assessment for each of the plurality of geodetic surveying devices or industrial measuring devices with respect to the measuring task,
- generate a workflow for performing the measuring task involving one or more of the apparatuses based on the ability assessment, the generating the workflow comprising a decomposing into sub-workflows,
- generate workflow data for each of the involved apparatuses, the workflow data allowing a respective apparatus to perform a part of the measuring task, and
- provide the workflow data to the software agents of the one or more apparatuses involved in the measuring task,
- wherein the first device is further configured to provide configuration data, based on the ability assessment, to the software agents of a respective apparatus of the one or more apparatuses involved in the measuring task, the configuration data being configured to reconfigure the respective apparatus for providing functions that allow performing the part of the measuring task by the respective apparatus,
- wherein the electronic apparatuses comprise at least one device configured to allow installing external software or deploying a set of microservices, and a software agent is installed on the at least one device as a software application,
- wherein the plurality geodetic surveying devices or industrial measuring devices comprise a plurality of measuring devices selected from the group consisting of a laser scanner and a laser tracker, wherein during the workflow generation process the first device is configured to request and receive from the plurality of agents information about a real-world location of the respective apparatus, wherein the configuration data is configured to reconfigure the respective apparatus to adapt to conditions of the real-world location of the respective apparatus,
- wherein the configuration data is configured to reconfigure the respective apparatus to adapt to safety regulations effective at the real-world location of the respective apparatus,
- wherein the configuration data is configured to reconfigure the respective apparatus to a set of rules effective at the real-world location of the respective apparatus by deactivating functions of the respective apparatus, wherein the set of rules comprise legal restrictions and
- wherein the configuration data is configured to reconfigure the respective apparatus to select an appropriate language for output of user instructions,
- wherein one or more of the plurality of apparatuses are remote apparatuses,
- wherein the measuring task comprises a measuring or a laying out a given object using a laser scanner,
- wherein the ability assessment comprises a dependency-tree analysis, and the workflow comprises:
  - if a sub-workflow meets all of its dependencies in a given agent module running the software agent locally, and
  - if a sub-workflow does not meet all the dependencies in one agent module running the software agent at least partly by the service bus.

2. The workflow generation system according to claim 1, wherein the workflow generation system further comprises at least one communication module that is configured to be connected to one of the electronic apparatuses and to exchange data with the apparatus connected thereto, wherein at least one of the software agents is installed on one of the communication modules, and each of the communication modules comprises a communication unit configured to communicate and exchange data with the first communication unit and other communication units of other communication modules of the workflow generation system.

3. The workflow generation system according to claim 1, wherein the configuration data provided to at least one measuring device is configured to reconfigure the measuring device to adapt measurement parameters according to requirements of the measuring task or workflow.

4. The workflow generation system according to claim 3, wherein the measurement parameters comprise a measuring precision or a measuring program speed of the measuring device.

5. The workflow generation system according to claim 4, wherein reconfiguring the measuring device comprises optimizing the measurement parameters with regard to a measuring precision or a duration of a measurement.

6. The workflow generation system according to claim 1, wherein:
- the plurality of apparatuses comprise at least one laser scanner,
- a part of the workflow comprises using the laser scanner for performing a scan with a needed resolution, and
- the configuration data provided to the laser scanner is configured to reconfigure the laser scanner to perform the scan with no more than the needed resolution for performing the scan faster.

7. The workflow generation system according to claim 1, wherein the plurality of apparatuses comprise at least one laser scanner, a part of the workflow comprises using the laser scanner for performing a scan within a given time, and the configuration data provided to the laser scanner is configured to reconfigure the laser scanner to perform the scan with the maximum possible resolution for performing the scan in the given time.

8. The workflow generation system according to claim 1, wherein the plurality of apparatuses comprise one or more actuating devices.

9. The workflow generation system according to claim 1, wherein the at least two cooperating apparatuses have incompatible software standards, and the configuration data provided to said cooperating apparatuses is configured to reconfigure the cooperating apparatuses for providing functions to allow the cooperating apparatuses to work together.

10. The workflow generation system according to claim 1, wherein the workflow data and configuration data are provided to software agents of the one or more remote apparatuses via the Internet.

11. The workflow generation system according to claim 1, wherein the first device comprises an encoding algorithm that is configured to encode the configuration data, and the software agents comprise a decoding algorithm that is configured to decode the configuration data encoded by the encoding algorithm, wherein the encoded configuration data is provided to the software agents.

12. The workflow generation system according to claim 1, wherein the configuration data is configured to reconfigure the respective apparatus to work with a coherent system of units used throughout the workflow.

13. The workflow generation system according to claim 1, wherein the plurality of apparatuses comprises at least one distance measuring device and the configuration data is configured to reconfigure a light intensity of a laser of the distance measuring device.

14. The workflow generation system according to claim 1, wherein the configuration data is configured to reconfigure the respective apparatus to block at least one functionality of the apparatus.

15. The workflow generation system according to claim 1, wherein the configuration data is configured to reconfigure the respective apparatus to block one or more functionalities of the apparatus that are not required for performing the task or the part of the task.

16. The workflow generation system according to claim 1, wherein during the workflow generation process the first device is configured to request and receive from the plurality of agents task-specific data of the apparatuses, wherein the task-specific data comprises information about properties, a position, or a workload that are associated with the respective apparatus, wherein the configuration data is provided based on the task-specific data.

17. The workflow generation system according to claim 1, wherein the first device is configured to perform the workflow generation process fully autonomously.

18. The workflow generation system according to claim 1, wherein the first device is configured to provide a signal to the software agents of the one or more apparatuses involved in the measuring task to trigger executing the workflow by the respective apparatuses.

19. A computer-implemented method for generating a task-specific workflow to perform a measuring task involving a cooperation of two or more devices jointly by means by a plurality of electronic apparatuses consisting of one or more measuring devices, wherein the plurality of electronic apparatuses comprise one or more geodetic surveying devices or industrial measuring devices,
wherein the method is performed with a workflow generation system, wherein the workflow generation system comprises a first device having a computing unit, a memory unit and a first communication unit and a service bus connecting the first device with the plurality of electronic apparatuses, the method comprising:
providing a software agent in an agent module to each one of the apparatuses wherein each software agent is configured to exchange data with an electronic apparatus from the plurality of electronic apparatuses and wherein providing the software agent comprises installing a software agent on the apparatus or connecting a communication module to the apparatus having the software agent installed thereon;
receiving, by the first device, information about the measuring task to be performed;
performing an ability assessment for each of the plurality of geodetic surveying devices or industrial measuring devices with respect to the measuring task,
performing a workflow generation process based on the ability assessment, comprising generating, by means of an algorithm and based on the measuring task, a workflow for performing the measuring task, the workflow involving one or more of the apparatuses, the generating the workflow comprising a decomposing into sub-workflows;
generating workflow data for a respective apparatus of the one or more apparatuses, based on the ability assessment, involved in the measuring task, the workflow data allowing the respective apparatus to perform a part of the task;
generating configuration data for at least one of the involved apparatuses, the configuration data being configured to reconfigure the respective apparatus for providing functions which allow performing the part of the measuring task; and
providing the respective workflow data and configuration data to the software agents of the one or more apparatuses involved in the measuring task,
the method further comprising installing a software agent on at least one of the electronic apparatuses as a software application by means of a mobile application that can be used only for a certain workflow,
wherein one or more of the plurality of apparatuses are remote apparatuses,
wherein one or more geodetic surveying devices or industrial measuring devices comprise at least one laser scanner,
a part of the workflow comprises using the laser scanner for performing a scan with a needed resolution or a scan within a given time,
the configuration data provided to the laser scanner is configured to reconfigure the laser scanner to perform the scan respectively with no more than the needed resolution for performing the scan faster or to perform the scan with the maximum possible resolution for performing the scan in the given time, and
wherein the configuration data is configured to reconfigure the respective apparatus to a set of rules effective at the real-world location of the respective apparatus by deactivating functions of the respective apparatus, wherein the set of rules comprise legal restrictions,
wherein the ability assessment comprises a dependency-tree analysis, and the workflow comprises:
if a sub-workflow meets all of its dependencies in a given agent module running the software agent locally, and
if a sub-workflow does not meet all the dependencies in one agent module running the software agent at least partly by the service bus.

20. The computer-implemented method according to claim 19, further comprising installing at least one of the software agents on one of at least one communication module, wherein the communication module:
is connected to one of the electronic apparatuses and is configured to exchange data with the one or more of the electronic apparatuses, and
comprises a communication unit configured to communicate and exchange data with the first communication unit and other communication units of other communication modules of the system.

21. The computer-implemented method according to claim 19, wherein the at least one of the involved apparatuses is reconfigured by the configuration data to comprise the functions that allow performing the part of the measuring task, and executes the part of the measuring task according to the workflow data using said functions.

22. The computer-implemented method according to claim 19, wherein the measuring task is performed according to the workflow by the one or more apparatuses involved in the measuring task.

23. The computer-implemented method according to claim 19, wherein the plurality of apparatuses comprise at least one laser scanner or laser tracker.

24. The computer-implemented method according to claim 19, wherein at least one measuring device is reconfigured by the configuration data to adapt a measuring precision or a measuring program speed of the measuring device according to requirements of the measuring task or workflow.

25. The computer-implemented method according to claim 19, wherein the measurement parameters comprise a measuring precision or a measuring program speed of the measuring device.

26. The computer-implemented method according to claim 25, wherein reconfiguring the measuring device comprises optimizing the measurement parameters with regard to a measuring precision or a duration of a measurement.

27. The computer-implemented method according to claim 19, further comprising sending feedback from the involved apparatuses to the first device, the feedback comprising information about non-completion of a task and errors.

28. The computer-implemented method according to claim 26, further comprising re-assigning, based on the feedback information and using machine-learning, the task to another apparatus of the plurality of apparatuses.

29. A computer program product comprising non-transitory program code which is stored on a non-transitory machine-readable medium and having computer-executable instructions, which when executed, cause the computer program product to perform operations of a task-specific workflow involving a cooperation of two or more devices to perform a measuring task jointly by means by a plurality of electronic apparatuses having one or more measuring devices;
wherein the operations are performed on a workflow generation system, wherein the workflow generation system comprises a first device having a computing unit, a memory unit and a first communication unit a service bus connecting the first device with the plurality of electronic apparatuses, the operations comprising:
providing a software agent in an agent module to each one of the apparatuses wherein each software agent is configured to exchange data with an electronic apparatus from the plurality of electronic apparatuses and wherein providing the software agent comprises installing a software agent on the apparatus or connecting a communication module to the apparatus having the software agent installed thereon;
receiving, by the first device, information about the measuring task to be performed;
performing an ability assessment for each of the plurality of geodetic surveying devices or industrial measuring devices with respect to the measuring task;
performing a workflow generation process, based on the ability assessment, comprising generating, by means of an algorithm and based on the measuring task, a workflow for performing the measuring task, the workflow involving one or more of the apparatuses, the generating the workflow comprising a decomposing into sub-workflows;
generating workflow data for a respective apparatus of the one or more apparatuses involved in the measuring task, based on the ability assessment, the workflow data allowing the respective apparatus to perform a part of the task;
generating configuration data for at least one of the involved apparatuses, the configuration data being configured to reconfigure the respective apparatus for providing functions which allow performing the part of the measuring task; and
providing the respective workflow data and configuration data to the software agents of the one or more apparatuses involved in the measuring task,
wherein the workflow generation system comprises one or more of the plurality of electronic apparatuses,
wherein one or more of the plurality of apparatuses are remote apparatuses,
wherein the electronic apparatuses of the system comprise at least one device configured to allow installing external software or deploying a set of microservices, and a software agent is installed on the at least one device as a software application, particularly provided by means of a mobile application that can be used only for a certain workflow,
wherein during the workflow generation process the first device is configured to request and receive from the plurality of agents information about a real-world location of the respective apparatus, wherein the configuration data is configured to reconfigure the respective apparatus to adapt to conditions of the real-world location of the respective apparatus,
wherein the configuration data is configured to reconfigure the respective apparatus to adapt to safety regulations effective at the real-world location of the respective apparatus, and
wherein the plurality of apparatuses comprises at least one distance measuring device and the configuration data is configured to reconfigure a light intensity of a laser of the distance measuring device based on the safety regulations
wherein the ability assessment comprises a dependency-tree analysis, and the workflow comprises:
if a sub-workflow meets all of its dependencies in a given agent module running the software agent locally, and
if a sub-workflow does not meet all the dependencies in one agent module running the software agent at least partly by the service bus.

30. A workflow generation system comprising:
a first device having a computing unit, a memory unit, and a first communication unit, wherein the memory unit includes a non-transitory machine-readable medium and having computer-executable instructions, which when executed, cause the computer program product to perform operations;
a plurality of software agents that are configured to be used with a plurality of electronic apparatuses comprising one or more measuring devices, wherein each software agent of the plurality of software agents is installable on an electronic apparatus of the plurality of electronic apparatuses or installed on a communication module that is configured to be connected to one of the electronic apparatuses and to exchange data therewith, and wherein one or more of the plurality of apparatuses are remote apparatuses, and a service bus connecting the first device with the plurality of electronic apparatuses;

the operations comprising:

providing a software agent in an agent module to each one of the apparatuses wherein each software agent is configured to exchange data with the electronic apparatus from the plurality of electronic apparatuses and wherein providing the software agent comprises installing a software agent on the apparatus or connecting a communication module to the apparatus having the software agent installed thereon;

receiving, by the first device, information about the measuring task to be performed;

performing an ability assessment for each of the plurality of geodetic surveying devices or industrial measuring devices with respect to the measuring task;

performing a workflow generation process, based on the ability assessment, comprising generating, by means of an algorithm and based on the measuring task, a workflow for performing the measuring task, the workflow involving one or more of the apparatuses, the generating the workflow comprising a decomposing into sub-workflows;

generating workflow data for a respective apparatus of the one or more apparatuses involved in the measuring task, based on the ability assessment, the workflow data allowing the respective apparatus to perform a part of the task;

generating configuration data for at least one of the involved apparatuses, the configuration data being configured to reconfigure the respective apparatus for providing functions which allow performing the part of the measuring task; and providing the respective workflow data and configuration data to the software agents of the one or more apparatuses involved in the measuring task, wherein the workflow generation system comprises one or more of the plurality of electronic apparatuses, wherein the electronic apparatuses of the system comprise at least one device configured to allow installing external software or deploying a set of microservices, and a software agent is installed on the at least one device as a software application, particularly provided by means of a mobile application that can be used only for a certain workflow, wherein during the workflow generation process the first device is configured to request and receive from the plurality of agents information about a real-world location of the respective apparatus, wherein the configuration data is configured to reconfigure the respective apparatus to adapt to conditions of the real-world location of the respective apparatus, wherein the configuration data is configured to reconfigure the respective apparatus to adapt to safety regulations effective at the real-world location of the respective apparatus, and wherein the plurality of apparatuses comprises at least one distance measuring device and the configuration data is configured to reconfigure a light intensity of a laser of the distance measuring device based on the safety regulations, wherein the ability assessment comprises a dependency-tree analysis, and the workflow comprises:
if a sub-workflow meets all of its dependencies in a given agent module running the software agent locally, and
if a sub-workflow does not meet all the dependencies in one agent module running the software agent at least partly by the service bus.

* * * * *